United States Patent [19]

Maeda et al.

[11] 4,364,118

[45] Dec. 14, 1982

[54] OPTICAL DISK AND OPTICAL INFORMATION PROCESSOR

[75] Inventors: Takeshi Maeda, Kokubuji; Kazuo Shigematsu, Kawasaki; Seiji Yonezawa, Hachiouji, all of Japan

[73] Assignee: Hitachi, Ltd., Tokyo, Japan

[21] Appl. No.: 160,199

[22] Filed: Jun. 17, 1980

[30] Foreign Application Priority Data

Jun. 25, 1979 [JP] Japan .................................. 54-79210
Apr. 16, 1980 [JP] Japan .................................. 55-49235

[51] Int. Cl.$^3$ .......................... G11B 7/00; G11B 21/04
[52] U.S. Cl. ...................................... 369/44; 358/342
[58] Field of Search ............ 369/44; 358/128.5, 128.6; 250/201

[56] References Cited

U.S. PATENT DOCUMENTS

| | | | |
|---|---|---|---|
| 3,673,412 | 6/1972 | Olson | 369/44 X |
| 3,985,952 | 10/1976 | Adler | 369/44 |
| 4,067,044 | 1/1978 | Maeda et al. | 369/44 X |
| 4,223,187 | 9/1980 | Yonezawa et al. | 358/128.5 X |
| 4,238,843 | 12/1980 | Carasso et al. | 358/128.5 X |
| 4,260,858 | 4/1981 | Beiser | 358/128.5 X |

*Primary Examiner*—Stuart N. Hecker
*Attorney, Agent, or Firm*—Antonelli, Terry & Wands

[57] ABSTRACT

An optical disk for accumulating information in the form in which an information signal can be optically read, wherein to the end of additionally recording information, a line of pits are arrayed at periodical intervals on an information recording carrier and are recorded in a manner to minutely wobble in the rotating direction of the disk at a fixed period.

6 Claims, 40 Drawing Figures

| 1 | 2 | 3 | 4 | A | B | C | D | E |
|---|---|---|---|---|---|---|---|---|
| 0 | 0 | 0 | 0 | 1 | 1 | 0 | 0 | 1 |
| 0 | 0 | 0 | 1 | 1 | 1 | 0 | 1 | 1 |
| 0 | 0 | 1 | 0 | 1 | 0 | 0 | 1 | 0 |
| 0 | 0 | 1 | 1 | 1 | 0 | 0 | 1 | 1 |
| 0 | 1 | 0 | 0 | 1 | 1 | 1 | 0 | 1 |
| 0 | 1 | 0 | 1 | 1 | 0 | 1 | 0 | 1 |
| 0 | 1 | 1 | 0 | 1 | 0 | 1 | 1 | 0 |
| 0 | 1 | 1 | 1 | 1 | 0 | 1 | 1 | 1 |
| 1 | 0 | 0 | 0 | 1 | 0 | 0 | 0 | 0 |
| 1 | 0 | 0 | 1 | 0 | 1 | 0 | 0 | 1 |
| 1 | 0 | 1 | 0 | 0 | 1 | 0 | 1 | 0 |
| 1 | 0 | 1 | 1 | 0 | 1 | 0 | 1 | 1 |
| 1 | 1 | 0 | 0 | 1 | 1 | 1 | 1 | 0 |
| 1 | 1 | 0 | 1 | 0 | 1 | 1 | 0 | 1 |
| 1 | 1 | 1 | 0 | 0 | 1 | 1 | 1 | 0 |
| 1 | 1 | 1 | 1 | 0 | 1 | 1 | 1 | 1 |

OPTICAL DISK AND OPTICAL INFORMATION PROCESSOR

BACKGROUND OF THE INVENTION

1. Field of the Invention

This invention relates to an optical disk for accumulating digital information etc. in a form in which the data can be optically recorded and reproduced. More particularly, it relates to an optical disk suitable for additionally recording information and also to an information processor therefor.

2. Description of the Prior Art

In, for example, an optical disk for accumulating digital information in a form in which it can be optically recorded and reproduced, there has heretofore been proposed a system for additionally recording the information wherein a groove for guiding a light beam spot is provided in the optical disk in advance and wherein in recording the information, the light beam spot is guided in reliance on the guide groove (Press information Philips Nov. 7, 1978).

However, the prior-art optical disk in which the light beam spot is guided in reliance on the guide groove has a disadvantage as stated below. In order to execute the additional recording, any desired recording area (hereinbelow, termed "sector portion") must be reached by random access.

Figure 1A:
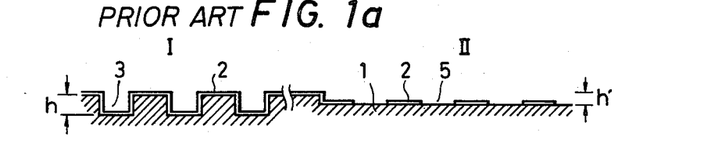
FIGS. 1(a) to 1(c) are views for explaining the construction of a prior-art disk.
Figure 1B:
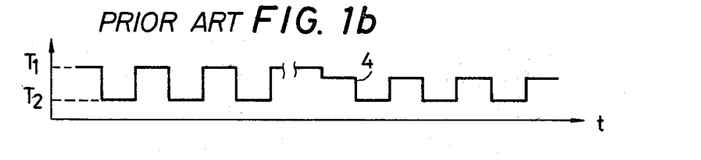
Figure 1C:
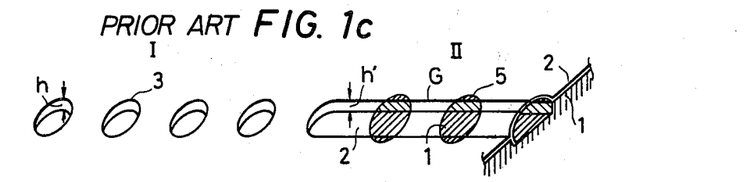

To this end, an address signal must be recorded in a part of the sector portion in advance. Now, this will be described with reference to the drawings. FIGS. 1(a) and 1(c) are views showing the structure of the optical disk provided with the guide groove. FIG. 1(a) is a sectional view in a direction tangential to the groove, while FIG. 1(c) is a schematic sectional view in a radial direction of the disk.

As illustrated in FIGS. 1(a) and 1(c), an address portion I is recorded by the phase type in which the phase of light waves is changed, and an additional recording portion II by the intensity type in which the intensity of light is changed. When this disk is subjected to reproduction by the reflection type, a signal 4 as shown in FIG. 1(b) is detected in correspondence with the pits. In the figures, numeral 1 designates a substrate, numeral 2 a metal film, letter h the depth of the pit 3 formed in the address portion I, and letter h' the depth of the groove G formed in the additional recording portion II. Shown at 5 is the pit which exists in the groove G.

The portion of the phase type is recorded in such a way that the substrate 1 (of, for example, PVC (polyvinyl chloride), glass or the like) is varied h in the depth direction. On the other hand, the portion of the intensity type is recorded depending upon the presence or absence of the metal thin film 2 which is evaporated or applied on the groove formed in the substrate 1. Letting $T_1$ denote the reflection factor of the thin metal film 2 and $T_2$ the reflection factor of the substrate 1, the detection signal 4 varies as shown in FIG. 1(b) as the readout spot moves in the direction of a time axis t. Usually, the reflection factor $T_2$ of the substrate 1 is 4–5%, and that $T_1$ of the thin metal film 2 is 40–50%. Moreover, when note is taken of the detection signal, reflected light intensities decrease in the pits of both the portions. Therefore, in case where the intensity type portion and the phase type portion have been separately recorded for the additional information and the address information, respectively, they cannot be distinguished insofar as the levels of the signal is concerned to the disadvantage of this type of recording.

SUMMARY OF THE INVENTION

An object of this invention is to provide an optical disk which can additionally record information easily.

Another object of this invention is to provide an optical disk which can reproduce information easily.

Still another object of this invention is to provide an optical information processor which is suited to record and reproduce information.

This invention for accomplishing such objects is characterized in that pits are recorded at any desired interval which is at least equal to the size of one information pit to be additionally recorded, and that the line of the pits is minutely wobbled at a fixed period in the recording, the recorded line of the pits serving as a guide groove.

DESCRIPTION OF THE PREFERRED EMBODIMENTS

Figure 2:
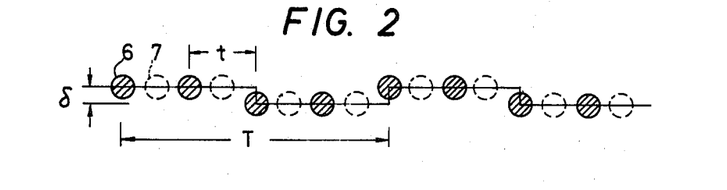
FIG. 2 is a diagram for explaining the array of a line of pits in a guide groove of this invention.

FIG. 2 is a diagram showing the construction of an embodiment of this invention.

In FIG. 2, pits 6 for a guide groove are indicated by solid lines (indicated by hatching), and pits 7 to be additionally recorded are indicated by dotted lines. For the sake of simplification, the pit interval of the guide groove corresponds to one pit of the additional recording. The line of the pits of the guide groove is recorded so as to wobble with respect to the traveling direction of the groove a minute amplitude δ at a period T, and the pit interval has a period t.

According to the disk of such construction, owing to the fact that the line of the pits previously recorded is wobbling at the minute amplitude δ during the additional recording, a tracking operation in which a light beam spot accurately tracks the line of the pits can be executed by a method disclosed in the specification of Japanese Published Unexamined Patent Application No. 49-103515 filed by the applicant of the present application, and it is permitted to additionally record the information pits.

Subsequently, since the line of the pits is always reproduced at the fixed period T, the PLL (phase locked loop) which has been used in order to accurately record and reproduce information against fluctuations in the rotating velocity of an information recording carrier in the recording and reproducing apparatus of this type, for example, a magnetic disk, a magnetic tape or the like, is easy to pull in and difficult to pull out.

Moreover, since the positions of the pits to be additionally recorded can be determined with reference to those of the pits of the guide groove, timing errors in the case of reproducing the information are lessened.

With the disk of such construction, the following effect is achieved. The additional recording is ordinarily carried out by the intensity type in which holes are provided in a thin metal film formed on a recording medium. As the guide groove, this invention is applicable to both the recording form of the intensity type stated above and the recording form of the phase type in which the pits are formed in the depth direction of the recording medium. Especially in case of the intensity type, it is unnecessary to work uneven parts in the information recording carrier in advance, a flat carrier can be used, and control information of addresses etc. are added at will, whereby the requirements of the users of the disks can be pliably met.

Figure 3:
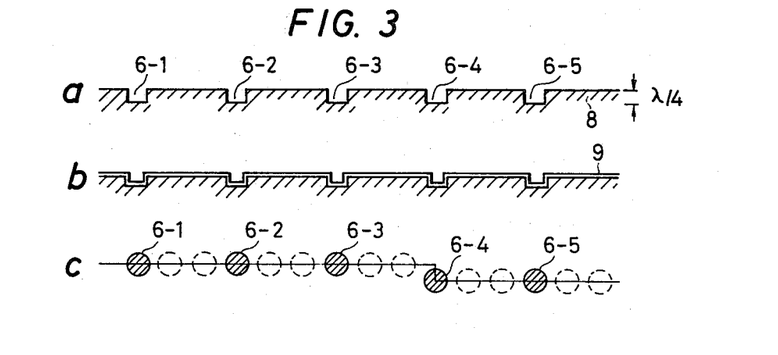
FIGS. 3a–c, 4 and 5a–c, are diagrams each serving to explain the construction of an embodiment of this invention.

FIG. 3 is a diagram showing another embodiment of this invention. Line (a) of FIG. 3 illustrates a section of a line of bits recorded. 6-1 to 6-5 indicate guide pits, the depth of which is made $\frac{1}{4}$ of the wavelength λ of a laser beam for use in the reproduction. Suitable as a disk substrate 8 is photoresist which is applied on a PVC (polyvinyl chloride) or glass disk ordinarily used as a duplication disk. Line (b) of FIG. 3 is a sectional view of a disk for additional recording. On the line of pits shown in (a) of FIG. 3, a thin metal film 9 is formed by an expedient such as evaporation. Line (c) of FIG. 3 shows a surface part in (b) of FIG. 3, and depicts the relation between the guide pits and additional recording pits similar to FIG. 2. In this embodiment, the sizes of the recording pit and the guide pit are approximately equal.

Figure 4:
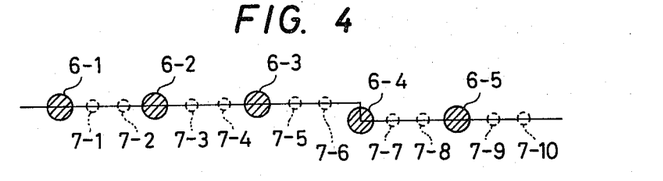

A third embodiment is shown in FIG. 4. The sectional shape of guide pits is similar to that in (a) of FIG. 3, and the preparation of an additionally-recorded disk is also similar to that in (b) of FIG. 3. However, the size of the guide pits 6-1 to 6-5 is made larger than that of recording pits 7-1 to 7-10 in order to facilitate separating the guide pits and the recording pits when the additionally-recorded information are to be reproduced. Thus, the guide pits and the recording pits can be separated on the basis of a waveform at the reproduction by utilizing unequal signal levels.

Figure 5:
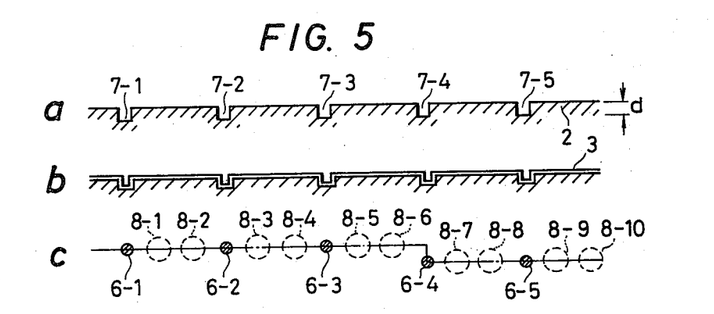

Further, a fourth embodiment is shown in FIG. 5. The sectional shape of guide pits is depicted in (a) of FIG. 5. The depth of the pits is denoted by d. A disk is prepared as in (b) of FIG. 3, but the size of the guide pits 6-1 to 6-5 is made smaller than the recording pits 8-1 to 8-10 for the same reason as in the third embodiment. In this way, the guide pits and the recording pits can be separated from a reproduced signal waveform. Although the depth d may well be $\frac{1}{4}$ of a reproducing laser wavelength λ, it should suitably be $\frac{1}{8}$.

Figure 6:
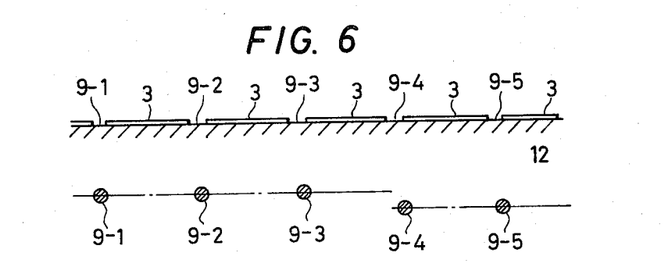
FIG. 6 is a diagram showing the construction of another embodiment of this invention.

A fifth embodiment is shown in FIG. 6. A guide groove is recorded by the intensity type in which holes are provided in a thin metal film formed on a disk surface. Also in this case, it is desirable that, in order to distinguish the guide pits from the recording pits, they are recorded in sizes different from each other as in the third and fourth embodiments. The guide pits 9-1 to 9-5 are recorded in the thin metal film 3 formed on an information recording carrier 12. By recording the guide groove in the intensity type, the additional recording disk which is capable of pliable compliance as stated before is prepared.

The additional recording can be reliably performed by forming the guide groove described above. Although, in the embodiments, the guide pit interval has been exemplified to include one recording pit or two recording pits, it is a matter of course that the invention is not restricted thereto.

Figure 7:
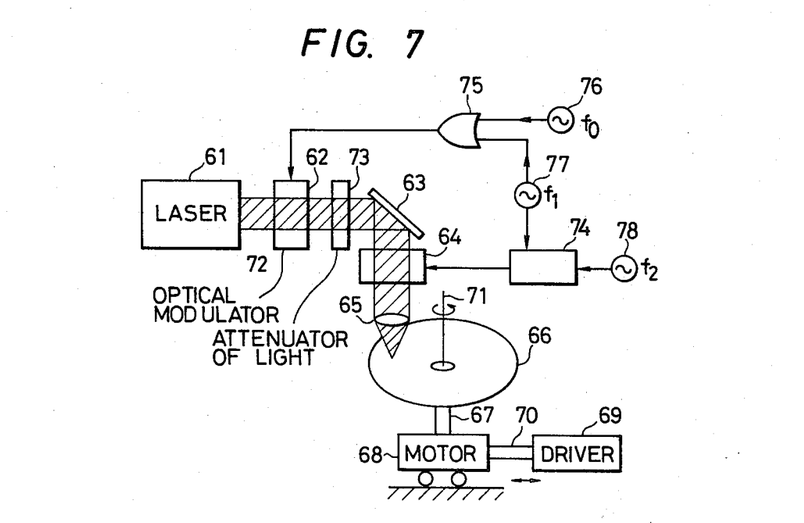
FIG. 7 is a view showing an example of a recording apparatus of this invention.
Figure 20:
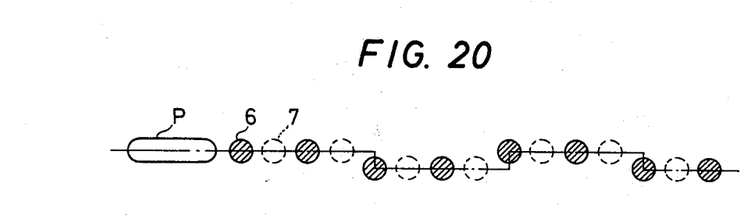
FIG. 20 is a diagram for explaining an embodiment of this invention.

A recording apparatus according to this invention for forming the guide grooves explained in the above embodiments will be described with reference to FIG. 7. A laser 61 beam 72 radiated from an argon ion laser for recording is subjected to an intensity modulation by passing through an optical modulator 62, and is adjusted through a light attenuator 73 so as to have the optimum power for the recording. After it is reflected by a reflective mirror 63, the reflected beam passes through an optical deflector 64 to be deflected in a very small quantity in a radial direction of a rotating disk 66 and is converged into a very small spot of about 1 μm on the surface of the disk 66 by an objective 65. The disk 66 is rotating about an axis of rotation 71 in the direction of the arrow. The rotational motion is caused through a spindle 67 from a motor 68. The disk is driven in the directions of arrows in such a manner that the disk 66, the spindle 67 and the motor 68 become unitary and that forces from a driver 69 having known means are transmitted thereto through an arm 70. A signal from an oscillator 76 having a period t and a repetition frequency $f_0$ and an output of an oscillator 77 having a repetition frequency $f_1$ are added up by an adder 75, an output of which is applied to the optical modulator 62 so as to modulate the beam. Since the disk is rotating at a constant speed by the signal at $f_0$, the guide pits of the period t as shown in FIG. 2 are formed. Although not shown in FIG. 2, a pit P for determining the phase of the wobbling as shown in FIG. 20 is also formed by the signal at $f_1$. On the other hand, an output from an oscillator 78 having a period T and a repetition frequency $f_2$ is applied to a synchronizer circuit 74 and is synchronized with the output of the oscillator 77, and the resultant output is applied to the optical deflector 64. In this way, the light beam is minutely vibrated on the disk surface, and the wobbling recording of the line of pits at the period T as illustrated in FIG. 2 is conducted. In order to form the guide pits explained previously, the embodiment employs as an information recording carrier a glass disk coated with photoresist and records the pits by the use of the recording apparatus of FIG. 7. Thereafter, the same course as a process for manufacturing a conventional record is traced to fabricate a replica. In the fifth embodiment, a glass disk or a PMMA (polymethyl methacrylate) disk on which a metal is evaporated can be used. The control of the size of the guide pit may be made in such a way that, in FIG. 7, a light intensity to be transmitted through the light attenuator 73 in which the thickness of an evaporated film is varied in a rotating direction is changed by a rotating motion. That is, when the intensity transmitted is high, the pit is formed to be large, and when the former is low, the latter is formed to be small.

Figure 8:
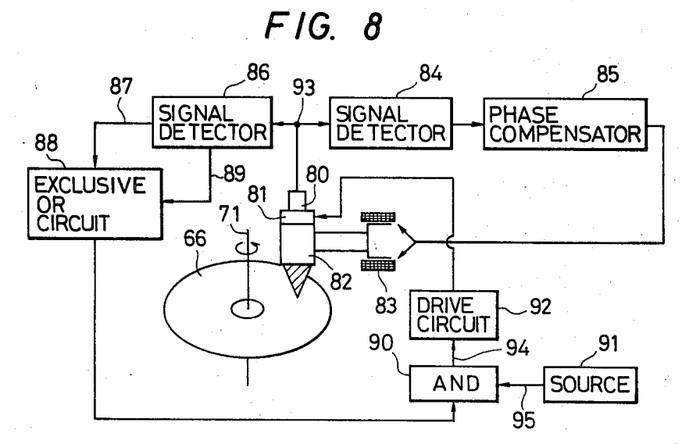
FIG. 8 is a view showing the construction of an embodiment of an additional recording apparatus according to this invention.

FIG. 8 is a view for explaining the construction of an embodiment of a recording apparatus of this invention. An optical disk 66 having the guide groove (guide pits) above stated is rotating in the direction of the arrow in the figure about an axis of rotation 71. A light beam (indicated by oblique lines) radiated through an optical system 82 from a semiconductor laser 81 is reflected by the optical disk 66, whereupon the reflected beam returns to the semiconductor laser 81 again through the optical path. Then, the quantity of light to emerge from the semiconductor laser 81 is modulated by the light returning from the disk. A signal on the disk can accordingly be read out in such a way that light emergent from one facet of the semiconductor laser 81 is detected by a photodetector 80. This detection method is based on the so-called self-coupling effect of a semiconductor laser as has been known.

Figure 9:
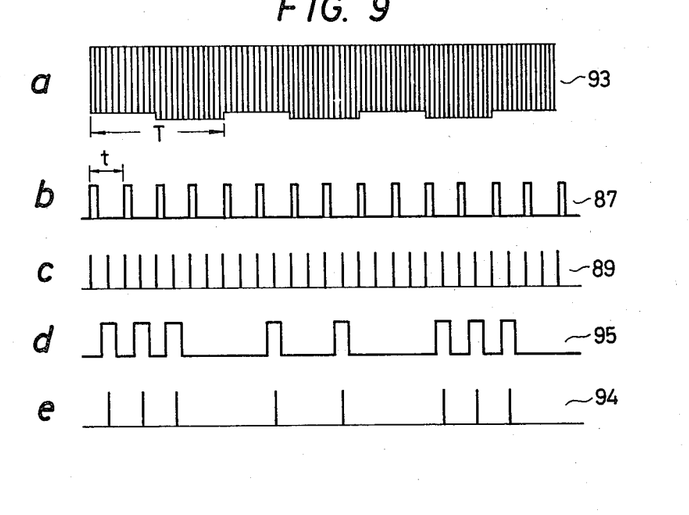
FIGS. 9a–e is a time chart of signals for explaining the operation of the apparatus shown in FIG. 8.

(a) of FIG. 9 shows a reproduced signal 93 from the detector 80. It is the change of the envelope of the signal owing to the guide groove of this invention that appears in the lower part of the reproduced signal 93. When the spot of the light beam is projected perfectly in the middle of the groove, the repetition period of the envelope becomes 2T. When the spot deviates from the groove towards either the inner periphery or outer periphery of the disk, a signal of a period T and a different phase appears in the envelope. The tracking is executed by utilizing this fact.

The signal 93 from the detector 80 is applied to a tracking signal detector 84, to detect a tracking signal by the known tracking method disclosed in the specification of Japanese Published Unexamined Patent Application No. 49-103515. The tracking signal is applied to a phase compensator 85, to stabilize a control system. An output of the phase compensator is used to drive a linear motor 83, and an optical head (consisting of the semiconductor laser and the optical system) connected to the linear motor is moved for the tracking. Thus, the light spot tracks the guide groove.

In order to perform the recording, first of all, the signal 93 from the photodetector 80 is applied to a digital signal detector 86. Here, a signal 87 (hereinbelow, termed "guide pulse signal") corresponding to the line of pits forming the guide groove and a periodic clock signal 89 are generated by a conventional means or method (for example, a comparator is used to convert an analog signal into a digital signal, or a phase synchronization in which a signal synchronous with the clock of a detection signal is generated is performed). The relation of the two signals on a time axis is seen from (b) and (c) of FIG. 9. This corresponds to the geometrical arrangement of FIG. 2 on the disk surface.

The guide pulses 87 and the periodic clock pulses 89 are applied to an additional-recording clock generator (exclusive OR circuit) 88 to take the exclusive OR, whereby a recording clock signal for the additional recording is generated from the two signals.

The recording clock signal is modulated by a modulator (AND circuit) 90 in accordance with an information signal 95 from a signal source 91 intended to be additionally recorded. The modulated signal 94 is applied to a semiconductor laser drive circuit 92, to modulate the laser oscillation power of the semiconductor laser.

Here, the recording clock pulses do not overlap the guide pulses 87 on the time axis. According to the above method, therefore, the additional-recording pits are formed between the pits forming the guide groove.

The simplest modulation method is such that, as illustrated in (d) and (e) of FIG. 9, the exclusive OR between the signal 87 and the signal 89 is taken to prepare the recording clock signal, whereupon the AND between the recording clock signal and the information signal 95 is taken to obtain the modulated signal 94.

An apparatus for reproducing the information recorded in the above way will be described with reference to FIG. 10.

Figure 10:
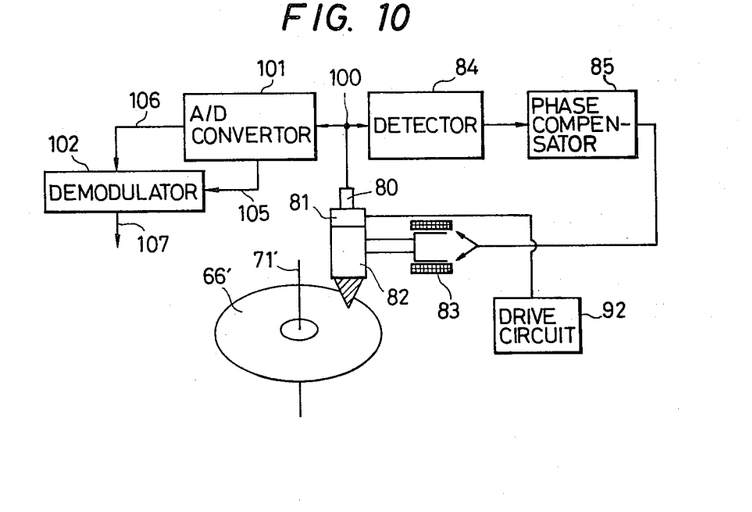
FIG. 10 is a constructional view of an embodiment of this invention of an apparatus for reproducing signals from a disk subjected to additional recording.
Figure 11A:
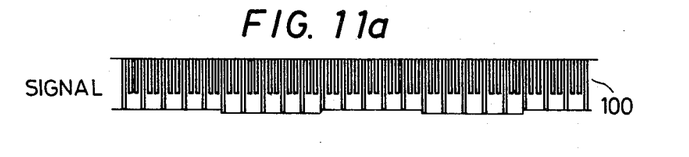
FIGS. 11A to 11F are diagrams showing the reproduced signals from the disk subjected to the additional recording.

FIG. 10, parts assigned the same numerals as in FIG. 8 effect the same operations and functions. As shown in FIG. 11A, a reproduced signal 100 becomes a waveform similar to that in (a) of FIG. 9 and differs from the latter in including the additional-recording information. A tracking signal is detected in the same way as in the embodiment of FIG. 8.

Figures 11B, 11C, 11D, 11E, 11F:
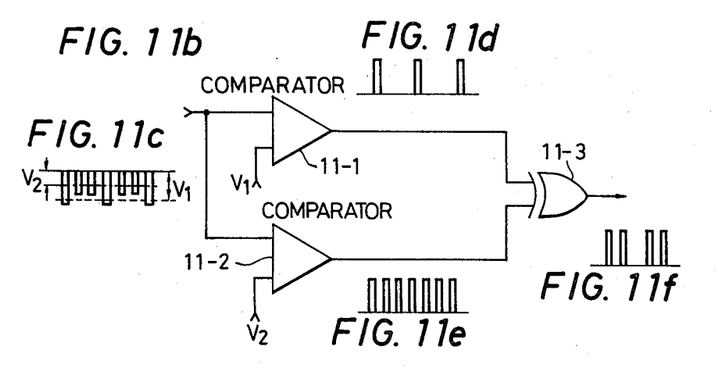

FIG. 11A illustrates the reproduced signal from the optical disk shown in FIG. 4. In this case, the degree of modulation of a signal from the additional-recording pits is lower in comparison with the degree of modulation of a signal from the pits forming the guide groove. Therefore, the additional information can be separated from among the data signal more easily than in the foregoing embodiment. That is, only the guide pulses are detected from the reproduced analog signal by selecting the levels of comparators, and using them, only the additional information signal can be detected from the data signal. More specifically, as illustrated in FIG. 11B, two comparators 11-1 and 11-2 are disposed, and outputs of these comparators are applied to an exclusive OR circuit 11-3. As shown in FIG. 11C, the threshold value of the signal level from the pits forming the guide groove is set to $V_1$, and that of the signal level from the additional-recording pits to $V_2$. The threshold values $V_1$ and $V_2$ are applied to one-side terminals of the comparators 11-1 and 11-2, and the signal shown in FIG. 11A is applied to the other terminals of the comparators 11-1 and 11-2, whereby signals shown in FIGS. 11D and 11E are obtained. By applying both these signals to the exclusive OR circuit 11-3, the additional information as shown in FIG. 11F is detected.

Figure 12:
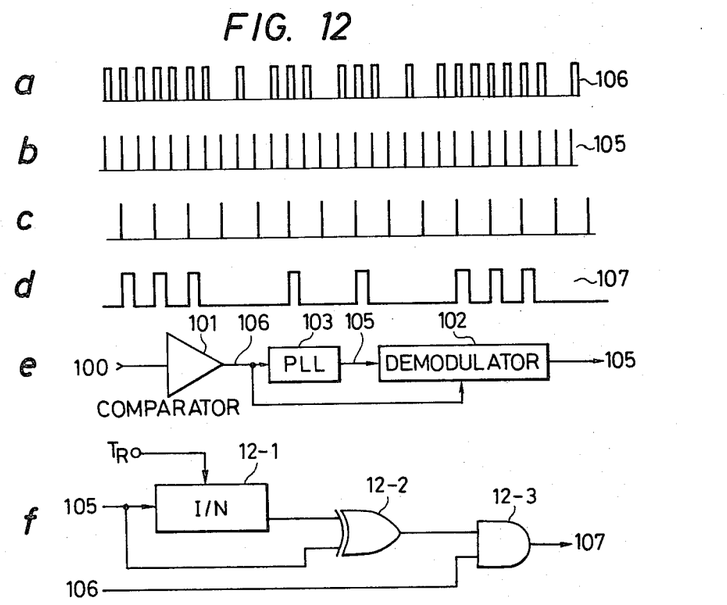
FIG. 12 is a time chart at the time when the signals are reproduced from the disk subjected to the additional recording.

The reproduced signal 100 provides the data signal 106 corresponding to the recorded pits (shown in (a) of FIG. 12) and a periodic clock signal 105 (shown in (b) of FIG. 12) through an analog-to-digital converter 101 and by a conventional method (the analog signal is converted into a digital signal by the use of a comparator, and pulses whose phase is synchronous with the periodic signal included in the reproduced signal are formed by a PLL).

The above operation is realized by an arrangement shown by a block diagram in (e) of FIG. 12. The arrangement in (e) of FIG. 12 is constructed of a comparator 101, a PLL circuit 103 and a demodulator 102, and it generates an information signal 107. The additionally-recorded information signal 107 is obtained by applying the two signals 106 and 105 to the demodulator 102.

The operation of the demodulator 102 will be described with reference to FIG. 12. Since the data signal 106 includes the guide pulses, the guide pulses are prepared from the periodic clock signal 105 (in this case, the guide pulses are a train of pulses at a fixed recurrence frequency, and hence, they can be obtained by dividing the frequency of the periodic clock pulses on the basis of a characteristic signal (the so-called trigger signal) indicative of the beginning of the data signal), and the recorded clock signal of the additional recording is reproduced by the exclusive OR between the guide pulses and the periodic clock signal 105, whereby a signal shown in (c) of FIG. 12 is obtained. When the AND between this signal and the data signal 106 is taken, the additional-recording information signal 107 (shown in (d) of FIG. 12) is obtained.

Such operation is realized by an arrangement shown by a block diagram in (f) of FIG. 12. The arrangement in (f) of FIG. 12 is constructed of a frequency divider circuit 12-1, an exclusive OR circuit 12-2 and an AND circuit 12-3. $T_R$ denotes a terminal for applying the trigger signal.

Figure 13:
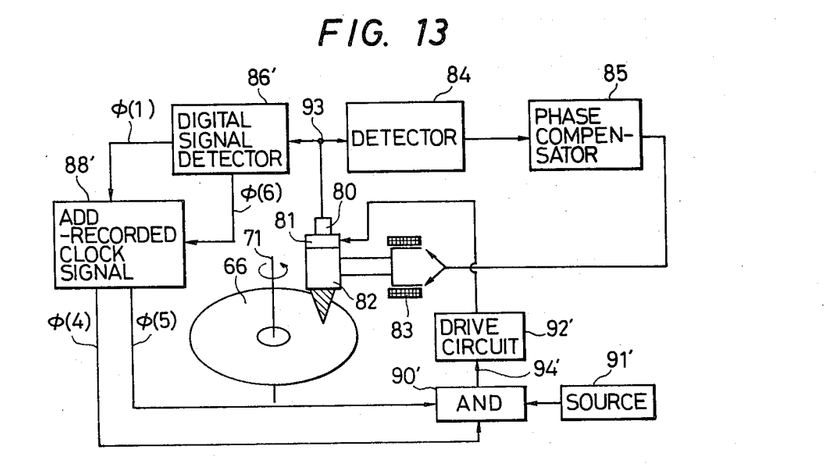
FIG. 13 is a view showing the construction of another embodiment of this invention.
Figure 15:
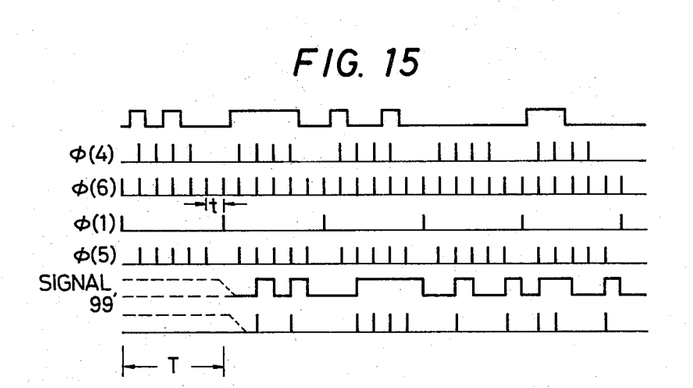

Still another embodiment will be described with reference to FIG. 13. A signal 93 from a photodetector 80 is applied to a digital signal detector 86' so as to generate a signal $\phi(1)$ corresponding to the line of pits forming the guide groove and a periodic clock signal $\phi(6)$. The relation of the two signals $\phi(1)$ and $\phi(6)$ on a time axis is illustrated in FIG. 15. In this embodiment, the repetition period T of the signal $\phi(1)$ and that t of the signal $\phi(6)$ are selected so as to satisfy the relation of $T = 6 \times t$. A method of preparing the pulse train of the signal $\phi(6)$ from the signal $\phi(1)$ indicative of the line of pits of the guide groove by means of a PLL is known.

The signals $\phi(6)$ and $\phi(1)$ are applied to an additional-recording clock signal oscillator 88', to form recording clock signals $\phi(4)$ and $\phi(5)$ shown in FIG. 15 by the use of a sequence circuit such as a known electric counter. An information signal (data) from a source 91' intended to be additionally recorded is modulated by a modulator (AND circuit) 90' in accordance with the recording clock signals, and the modulated signal 94' is applied to a semiconductor laser drive circuit 92' so as to modulate the laser oscillation power of a semiconductor laser.

The modulation system and the modulator 90' of the present embodiment will be described in detail. A method suitable as the modulation system of this invention is the combination between an encoding in which m bits of data are handled as a unit and converted into n recording bits, and the modulation of the code by NRZ 1 (non-return-to-zero one) (or by NRZ (non-return-to-zero)). Among such combinations, a case of using what is called 4/5MNRZ 1 will be stated as an example.

Figure 14:
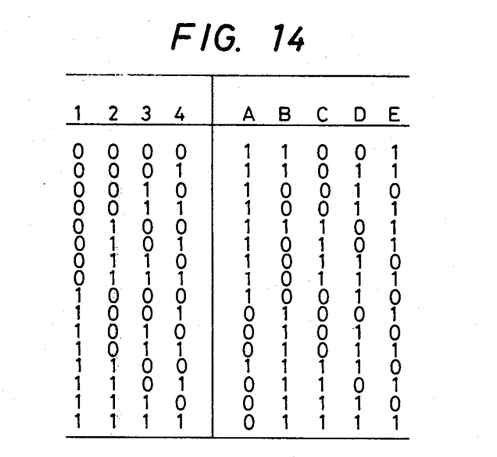
FIGS. 14 and 15 are diagrams for explaining the essential portions of this invention.
Figure 16:
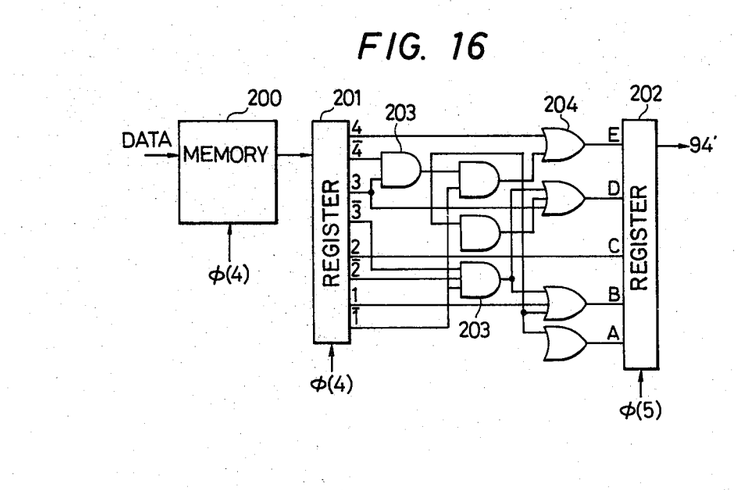
FIG. 16 is a diagram showing the construction of an embodiment of the essential portions of this invention.

The 4/5 conversion corresponds to a case where $m=4$ and $n=5$. A conversion table in this case is shown in FIG. 14. The construction of the modulator 90' is shown in FIG. 16, and the timing chart in FIG. 15. The data is first stored in a memory 200. The data is read out in accordance with the clock signal $\phi(4)$, and is shifted to a 4-bit register 201 every period T. By the combination between an AND circuit 203 and an OR circuit 204 in FIG. 16, the conversion illustrated in FIG. 14 is performed, and the code is latched in a 5-bit register 200. When it is read out in accordance with the clock signal $\phi(5)$, the modulated signal 94' is formed.

Figure 17:
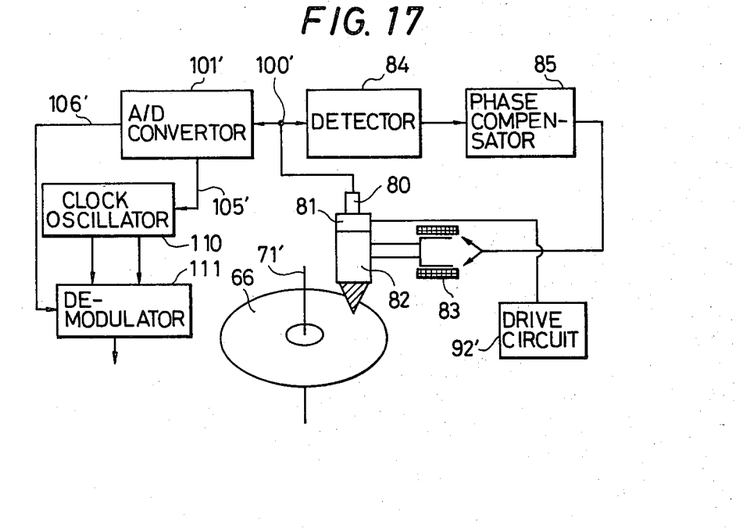
FIG. 17 is a view showing the construction of another embodiment of this invention.

An apparatus for reproducing the information recorded by the preceding embodiment will be described with reference to FIG. 17. In FIG. 17, a reproduced signal 100' generates through an analog-to-digital converter 101' a reproduced data signal 106' and a pulse signal 105' whose phase is synchronous with that of the periodic signal included in the reproduced signal.

There will be explained means for generating the signals 106' and 105' from the signal 100'. Since the 4/5 conversion is executed, at least one pit exists infallibly in a part which does not include the pits forming the guide groove, that is, a part in which the additional information is recorded. Since a signal component of a period t is therefore existent in the reproduced signal, the phase lock can be effected by a PLL in synchronism with this period and the signal 105' can be generated.

Figure 18:
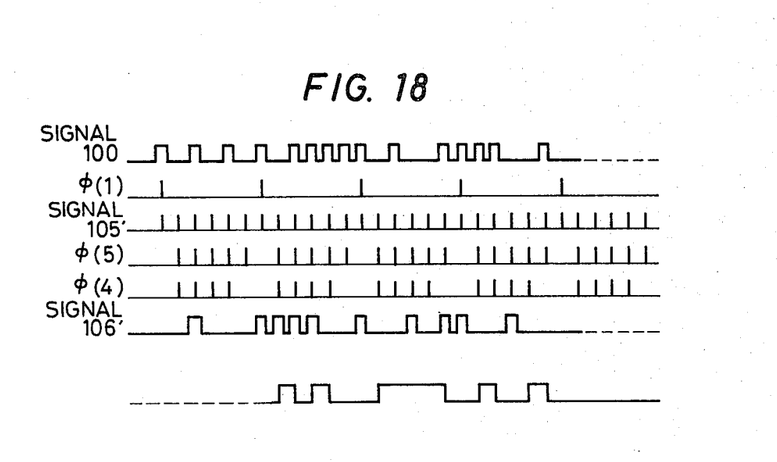
FIG. 18 is a diagram for explaining the operation of the embodiment in FIG. 17.

As illustrated in FIG. 18, a train of pulses $p(1)$ corresponding to the pits forming the guide groove is formed by the use of the foregoing signal 105'. More specifically, in the apparatus for recording digital information as in this invention, the recording information is divided into blocks each consisting of a specified number of bits, and a signal indicative of the borders of the blocks is infallibly inserted. Accordingly, when the relation of the signal $p(1)$ indicating the borders is put into a predetermined rule and the signal 105' has its frequency divided by 6 (six) by the use of the signal indicating the borders, the signal $p(1)$ is obtained.

When, using the aforecited signal $p(1)$, the signal corresponding to the pits forming the guide groove is removed from the reproduced signal 100', the reproduced data signal 106' is obtained. Means for demodulating the reproduced data signal 106' will be explained more with reference to FIG. 17.

The signal 105' is applied to a demodulating clock oscillator 110, to generate de-modulating clock signals $p(4)$ and $p(5)$. The reproduced data signal 106' is demodulated with a demodulator 111 in accordance with the signals $p(4)$ and $p(5)$, whereby demodulated data is obtained.

Figure 19:
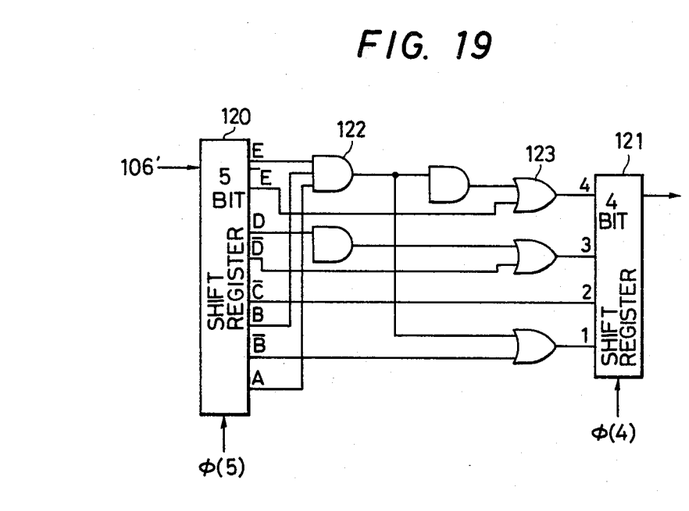
FIG. 19 is a diagram showing the construction of an embodiment of the essential portions of this invention.

A method of demodulation will be explained with reference to FIG. 19. The reproduced data signal 106' is put into a 5-bit shift register 120 in accordance with the signal $p(5)$, a pattern of 5 bits is converted into a pattern of 4 bits by the combination of AND circuits 122 and OR circuits 123, and the pattern of 4 bits is latched in a 4-bit shift register 121 and read out in accordance with the signal $p(4)$ every period T.

We claim:

1. In an optical disk having a recording medium which is capable of recording an information signal in a form permitting the information signal to be optically reproduced; a plurality of guide pits recorded in said recording medium at periodic intervals in a line which minutely wobbles in a rotating direction of said disk at a predetermined frequency, said line of guide pits forming a guide groove to be used for tracking control, and further including information pits designating predetermined information additionally recorded in said recording medium in the intervals between guide pits of said line of guide pits forming said guide groove.

2. An optical disk according to claim 1, wherein the guide pits which function to form said guide groove are larger in size than the information pits which are additionally recorded between said guide pits.

3. An optical disk according to claim 1, wherein the information pits which are additionally recorded between said guide pits are larger in size than the guide pits which function to form said guide groove.

4. An optical disk according to claim 1, wherein a plurality of information pits are included between each of the respectively adjacent ones of said guide pits which function to form said guide groove.

5. In an optical information processor for use with an optical disk having a recording medium which is capable of recording an information signal in a form permitting the information signal to be optically reproduced, and in which a plurality of guide pits are recorded in said recording medium at periodic intervals in a line which minutely wobbles in a rotating direction of said disk at a predetermined frequency so as to form a guide groove to be used for tracking control, said optical information processor comprising means for reading out the guide groove of said disk by detecting said guide pits and producing a detection signal therefrom;

means responsive to said detection signal for generating clock pulses having a period corresponding to that of said line of guide pits forming said guide groove;

means for generating a modulating signal in response to an applied data signal to be recorded and said clock pulses;

means including a light source for recording an information signal on the recording medium of said disk; and means responsive to said modulator signal for controlling said recording means for recording information pits in said recording medium in the intervals between guide pits of said line of guide pits forming said guide groove.

6. An optical information processor according to claim 5, further including tracking control means responsive to said detection signal for controlling said recording means to effect formation of said information pits along the line of said guide pits forming said guide groove.

* * * * *